United States Patent Office 2,945,139
Patented July 12, 1960

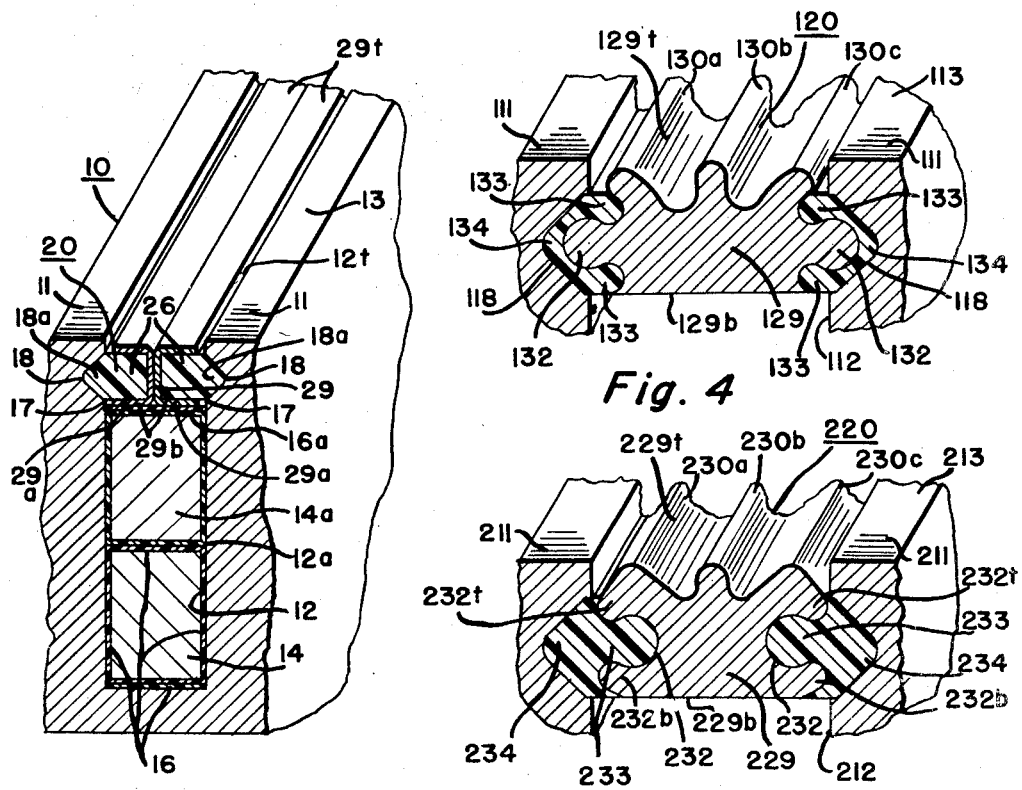

2,945,139

METHOD AND WEDGES FOR CONDUCTING HEAT FROM SLOTS OF DYNAMOELECTRIC MACHINE

Willard R. Stigler, Western Springs, and Walter Drabik, Downers Grove, Ill., assignors to General Motors Corporation, Detroit, Mich., a corporation of Delaware Filed Nov. 15, 1957, Ser. No. 696,821

6 Claims. (Cl. 310—214)

This invention relates to dynamoelectric machines, and, particularly, to a method and wedges for closing stator or rotor lamination slots into which conductors or windings have been placed and for conducting heat from the windings to outside the slots closed by the wedges.

An object of this invention is to provide a new and improved method of conducting heat away from conductors located in slot sections of a stationary or rotating member of an electric motor or generator by means of electrically insulated slot wedges including a central metal body of high thermal conductivity used both to hold the conductors in slots and to effect thermal transfer, conduction and dissipation to outside the slots.

Another object of this invention is to provide electrical insulating slot wedges for holding motor or generator windings in slots of stators or rotors and having a central member of a metal of high thermal conductivity for thermal transfer, conduction and dissipation to outside the slots away from the windings.

Another object of this invention is to provide a slot-closing wedge having an insulating body portion with a central gap portion extending longitudinally to receive a substantially H-shaped member of metal such as aluminum or brass with a high thermal conductivity to transfer heat from inside the slot through metal in the gap portion to outside the slots.

A further object of this invention is to provide slot-closing wedges having a central longitudinal member of extruded metal such as aluminum or an alloy of high thermal conductivity and having heat radiating fins as well as lateral insulating edges of extruded or machined polyester-glass bonded to the metal so as electrically to insulate the wedges from the slots and permit transfer, conduction, and dissipation of heat away from conductors adjacent one side of the wedges to the opposite side thereof outside the slots.

Another object of this invention is to provide armature slot wedges having a median member of metal such as aluminum which is light in weight and high in thermal conductivity and which is extruded to include longitudinal heat-radiating fins as well as lateral flange portions or beading adapted to be joined to lateral and longitudinally extending insulation edge pieces for holding the wedges and windings below the wedges in slots while the extruded light metal provides strength yet light weight relative to the centrifugal force as well as high heat conductivity for dissipating heat from the windings.

Further objects and advantages of the present invention will be apparent from the following description, reference being had to the accompanying drawing wherein preferred embodiments of the present invention are clearly shown.

In the drawings:

Fig. 1 is a fragmentary perspective view illustrating a transverse cross section of a wedge for retaining windings or conductors in slots of a laminated core member and embodying the present invention.

Fig. 2 is a plan view of the wedge and heat conducting member therefor of a type illustrated for insertion in a slot as shown in Fig. 1.

Fig. 3 is a side elevational view of the wedge and heat conducting member of Fig. 2.

Fig. 4 is a fragmentary cross-sectional perspective view of a modified wedge in accordance with the present invention.

Fig. 5 is a fragmentary cross-sectional perspective view of a wedge similar to the modification of Fig. 4 in accordance with the present invention.

Wedges or slot closers driven longitudinally into slots of stators or rotors generally are provided for the purpose of holding coils, windings or conductors firmly in place in the slot. Wedges usually are made in short lengths of a non-conductive material having sufficient strength to hold conductors or windings in place and to resist centrifugal force exerted by coils when an armature is rotating. However, electric current passing through the conductors is subjected to electrical resistance which converts some of the electric energy into heat. This heat must be removed and use of open cooling ducts through the laminations forming the slots or through the wedges proves expensive and also weakens and complicates retention of windings in the slots. The present invention provides a method and wedges for holding conductors and simultaneously effectively dissipating heat from the conductors.

Fig. 1 shows a portion of an armature core formed of a plurality of laminations 11 of steel or thin magnetic material. A slot 12 extends inwardly from a peripheral surface 13 of the laminations and each slot includes a bottom portion 12a into which a coil, winding, or conductors of any number are imbedded in any desired pattern. Conductors 14 and 14a are illustrated in Fig. 1 as they are placed one top of the other in bottom portion 12a of slot 12. Each of these conductors is insulated from lateral and bottom surfaces of slot 12 and also insulated from each other by a suitable insulating material such as a rigid insulating paper indicated by numeral 16. An uppermost surface of conductor 14a is covered by one or more layers of such insulating paper 16a. This paper layer 16a is adjacent to or slightly below a lower corner 17 of each of a pair of V-shaped grooves 18 extending outwardly from opposite lateral surfaces of each slot. It is to be understood that a plurality of slots like slot 12 can be formed by the laminations of magnetic metal or stamped out sheet steel.

The conductors or windings imbedded in each slot are connected to a source of electrical energy resulting in passage of electrical current through the conductors for generating a desired flux pattern throughout and about the metal laminations but also resulting in conversion of some electrical energy into heat which must be removed from within each slot. However, the conductors are held or retained in each slot by a retaining means or slot wedge generally indicated by numeral 20. Previously, cooling ducts have been formed between laminations 11 or through slot wedges having ventilating ducts for cooling and heat removal. Formation of such cooling ducts is complicated and often expensive to obtain and also often results in a weakening of an armature core and in a decrease in effective holding of conductors inside slots against centrifugal force of the conductors and slot wedges during rotation of an armature core, for example.

Fig. 1 illustrates a wedge 20 forced into a top space 12t of slot 12. As seen in views of Figures 1, 2, and 3, the wedge 20 includes a body portion 22 of insulating material. A central longitudinally extending gap or cutout portion 23 extends a predetermined distance from a tapered bottom surface end 24 toward a blunt opposite end 25 of the body portion. The gap separates parallel and longitudinal leg portions or segments 26 integral at one end with and forming part of the body portion. A central member or solid body 28 of metal which is light in weight and has a high thermal conductivity is provided to fill the gap for holding the conductors in the slot and for transferring, conducting and dissipating heat from inside the slot. Preferably aluminum or brass should be used as metal for this central member.

In the embodiment of Figures 1, 2, and 3, a central member is provided having an H-shaped transverse cross section viewed in Fig. 1 and including a midportion 29 which is formed of face to face bases of a pair of U-shaped longitudinal channels or sections 29a. Legs or sides of each channel form a bottom surface 29b and a top surface 29t of the central member relative to the body portion of the wedge and the slot. The bottom surface 29b is adjacent to a top surface of insulating paper covering top conductor 14a. Heat from the conductors inside the slot is transferred and conducted from bottom leg surface 29b of the U-shaped sections through the midportion 29 of the H structure to the top leg surface 29t where heat dissipation to surrounding atmosphere occurs. It is to be understood that the H-shaped central body of the wedge in accordance with the present invention can be formed of separate channel sections as shown or can be extruded as a unitary H-shaped body. In any event, the midportion 29 is clamped or secured between the longitudinal legs 26 as the insulating body 22 is driven by force applied against blunt end 25 into a space at the top of the slot between V-shaped grooves 18. The leg portions have V-shaped edges or side rails 18a which are formed complementary to the V-shaped lateral slot grooves 18 at opposite sides of the space near the top of the slots into which the wedges are forced. The tapered surface 24 shown in Fig. 3 serves to facilitate forcing of the wedge into the grooved slot. The tapered surface is formed after the central member for heat conduction is assembled with the insulating body 22.

A variation of the present invention is illustrated in each of the views of Figures 4 and 5. In Fig. 4 the laminations 111 form a peripheral surface 113 and a slot 112 while in Fig. 5 comparable structure is identified by numerals 211, 213, and 212, respectively. Wedges of a metal such as extruded aluminum or brass each with a high thermal conductivity and light in weight (especially aluminum) are indicated generally by numerals 120 and 220 in Figures 4 and 5, respectively. Midportions 129 and 229, respectively, are shown in Figures 4 and 5 comparable to midportion 29 as to function described above. Top surfaces 129t and 229t as well as bottom surfaces 129b and 229b are represented in Figures 4 and 5 comparable to surfaces 29t and 29b of the embodiment of Figures 1–3. Each of the slot wedges 120 and 220 is provided with a plurality of upwardly protruding and longitudinally extending heat radiating fins 130a, 130b, 130c and 230a, 230b, 230c, respectively, for increase in top surface areas 129t and 229t, respectively.

In the embodiment of Fig. 4, the central member having midportion 129 has laterally and longitudinally extending beads or flanges 132 complementary to inner socket-like surface ends or dove-tail-joint-type portions 133 of side rails, segments, or insulating edge means 134. The insulating edge means 134 have a V-shaped outer surface which is complementary to V-shaped grooves 118 extending laterally-outwardly from a top portion of slot 112. Surface 129b is made substantially smooth so as to facilitate forcing of the wedges over insulating paper and conductors in the slot. The slot wedge 120 is preferably made of extruded aluminum and includes the integral heat radiating fins. The flanges 132 are located intermediate the top and bottom surfaces. The heat radiating fins serve also to increase air turbulence surrounding the slot wedges when the wedges are used to close slots of a rotor or armature. The flanges in cooperating with the side segments 134 support the central member or solid light-metal body across the top of the slot between the V-shaped grooves 118 holding the insulating paper and conductors inside the slot against centrifugal force as is encountered with a rotor or armature.

In the embodiment of Fig. 5, the central member having midportion 229 for transfer, conduction, and dissipation of heat has laterally and longitudinally extending beads or flanges 232b and 232t extending adjacent bottom and top surfaces, respectively, to form opposite longitudinally extending cavities 232 that are interlocked with a socket-like end or dove-tail-joint-type portion 233. Flanges 232t are preferably extruded out of aluminum integral with the heat radiating fins 230a and 230c. Except for the interlocking end and flange portions, the side rails or segments 134 of Fig. 4 are substantially like segments 234 of Fig. 5 and both have a V-shaped outer surface which is complementary to V-shaped lateral grooves of each slot. Segments 134 and 234 can be comparable to legs 26 in being joined at one end by a body portion like 22 of the embodiment of Figures 1–3. However, the segments 134 and 234 are preferably preformed channel portions or are made of extruded insulating material such as plastic or polyester-glass that can be machined if necessary. Extruded or machined polyester-glass forming the edge means can be bonded or otherwise secured only by dove-tail fitting relative to the one or more lateral flanges of the aluminum or brass solid body or central member.

Aluminum is light in weight and has a high thermal conductivity and is therefore preferred as the metal for the central member. Since the central member is insulated from the sides of each slot and is not in contact with the steel lamination core, undesirable stray flux or current which such contact would engender is avoided.

The method of conducting heat away from conductors located in slots includes the steps of providing a slot wedge having a longitudinal solid body member of extruded light weight metal having a high thermal conductivity and having longitudinal insulating side rails or segments attached thereto. By forcing the insulating material segments and combined light metal central members over the top of conductors imbedded in each slot, the solid body member of metal having high thermal conductivity is positioned adjacent to at least one of the conductors and transferring, conducting, and transmitting of heat from the conductors through the insulating paper in each slot to the body member is made possible. At the same time the insulating segments and light metal body member are holding the conductors in place in the slots. Fitting and retaining of an H-shaped metal member between leg portions of an insulating body can also be included as described with the embodiment of Figures 1–3. Dissipating the heat is one function of the top surface and integrally extruded heat radiating fins.

While the embodiments of the present invention as herein disclosed constitute a preferred form, it is to be understood that other forms might be adopted.

What is claimed is as follows:

1. A slot wedge for retaining dynamoelectric machine conductors firmly in place in lamination slots, comprising, a central longitudinal member of extruded metal having a high thermal conductivity, heat radiating fins integral with said member and extending outwardly from one surface of said member opposite to a smooth surface to be forced over conductors in each slot, at least one lateral flange extending outwardly on each of opposite sides of said member and located above the smooth surface and below said heat radiating fins, side rail means of insulating material secured to said lateral flange on opposite sides and extending longitudinally of and supporting said central member of metal having high thermal conductivity.

2. A slot wedge for retaining dynamoelectric machine conductors imbedded in lamination slots, comprising, a central longitudinal member of extruded metal having a high thermal conductivity, heat radiating fins extruded integral with said member and extending outwardly from a top surface of said member opposite to a smooth undersurface to be forced over conductors in each slot, side rail means of insulating material located adjacent opposite lateral sides of said member, and dove-tail-type locking means provided complementary between said member on opposite sides joined laterally to said side rails, said locking means being located spaced inwardly from sides of each slot so that said metal central member is retained by and spaced away from lamination metal by said insulating side rail means to block passage of stray electromagnetic flux from lamination metal to said central member.

3. A slot wedge for retaining dynamoelectric machine conductors imbedded in steel-core lamination slots of an armature, comprising, a central longitudinal member of extruded aluminum which is light in weight and has a high thermal conductivity, heat radiating fin means extruded integral with said member and extending outwardly from a top portion of said member for dissipation of heat transferred by conduction from conductors in each slot through said aluminum member, side rail means of insulating material located adjacent opposite lateral edges of said member for supporting said member against centrifugal force of the rotating armature, the light weight aluminum serving to decrease effect of the centrifugal force on said member.

4. A slot wedge for retaining dynamoelectric machine conductors imbedded in steel-core lamination slots, comprising, a longitudinal solid body member of extruded light-weight metal having a high thermal conductivity, a plurality of heat radiating fins extruded integral with said body member and extending longitudinally and outwardly relative to a top surface thereof, flange means extruded integral with said body member and extending laterally outwardly thereof, insulating side segments each including at least one leg and attached to said flange means through at least one leg of said segments extending toward said body member and in locking engagement therewith, said segments supporting said body member which serves to transfer, conduct, and dissipate heat away from inside each slot yet maintains the conductors within the confines of the slot below said solid body member.

5. The slot wedge of claim 4 in which said side segments are formed of a preformed channel-type insulation that is slidable into engagement with said flange means of said wedge to be forced into a top portion of each of the slots.

6. The slot wedge of claim 4 in which said side segments are formed of polyester-glass insulation that is bonded to said flange means of said wedge to be forced into a top portion of each of the slots.

References Cited in the file of this patent

UNITED STATES PATENTS

| | | |
|---|---|---|
| 888,456 | Barr | May 26, 1908 |
| 1,311,466 | Sandfield | July 29, 1919 |
| 2,745,030 | Baldwin | May 8, 1956 |

FOREIGN PATENTS

| | | |
|---|---|---|
| 220,755 | Great Britain | Aug. 28, 1924 |
| 286,765 | Germany | Aug. 30, 1915 |
| 758,964 | Great Britain | Oct. 10, 1956 |